Jan. 17, 1933. L. C. STUKENBORG 1,894,643
BRAKE TESTING MEANS AND METHOD FOR AUTOMOBILES
Filed May 27, 1929 3 Sheets-Sheet 1
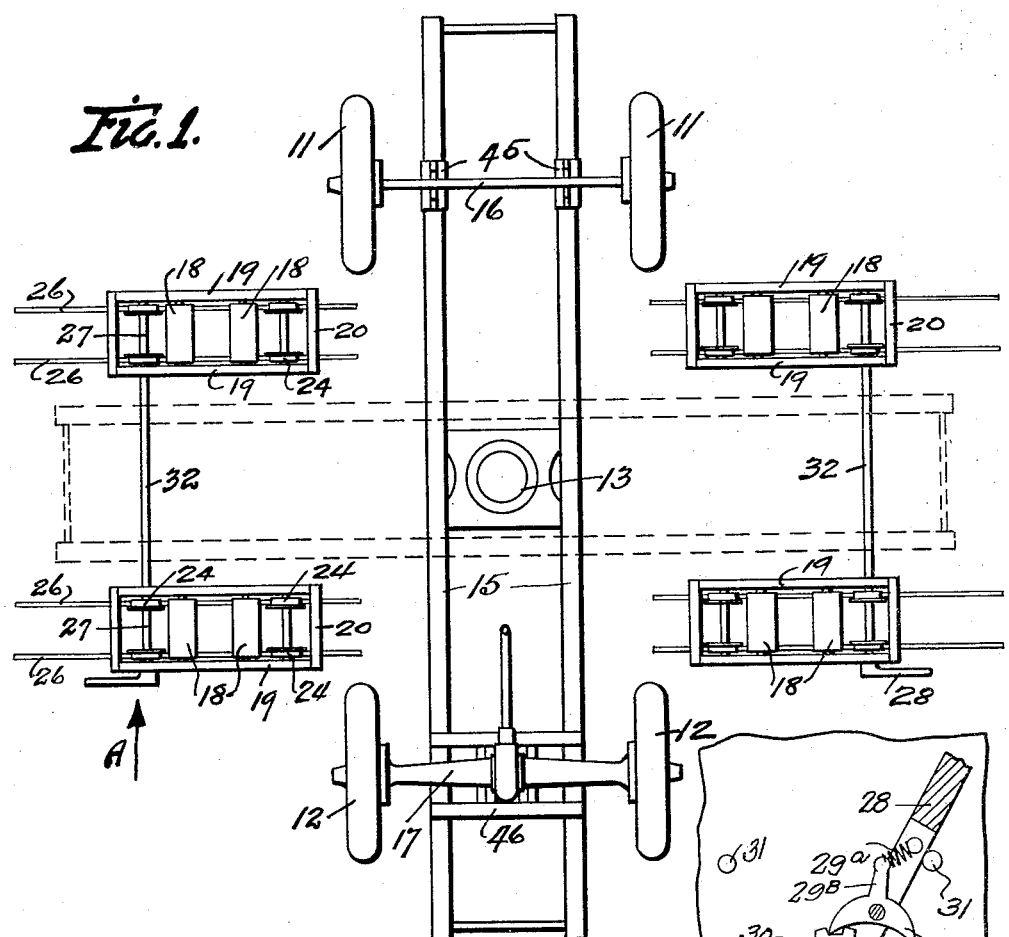
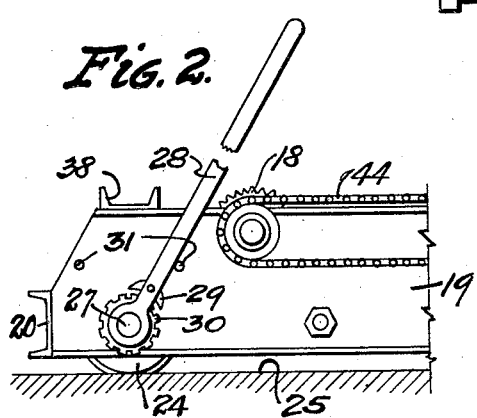
INVENTOR
LOUIS C. STUKENBORG.
J. H. Weatherford
ATTORNEY.

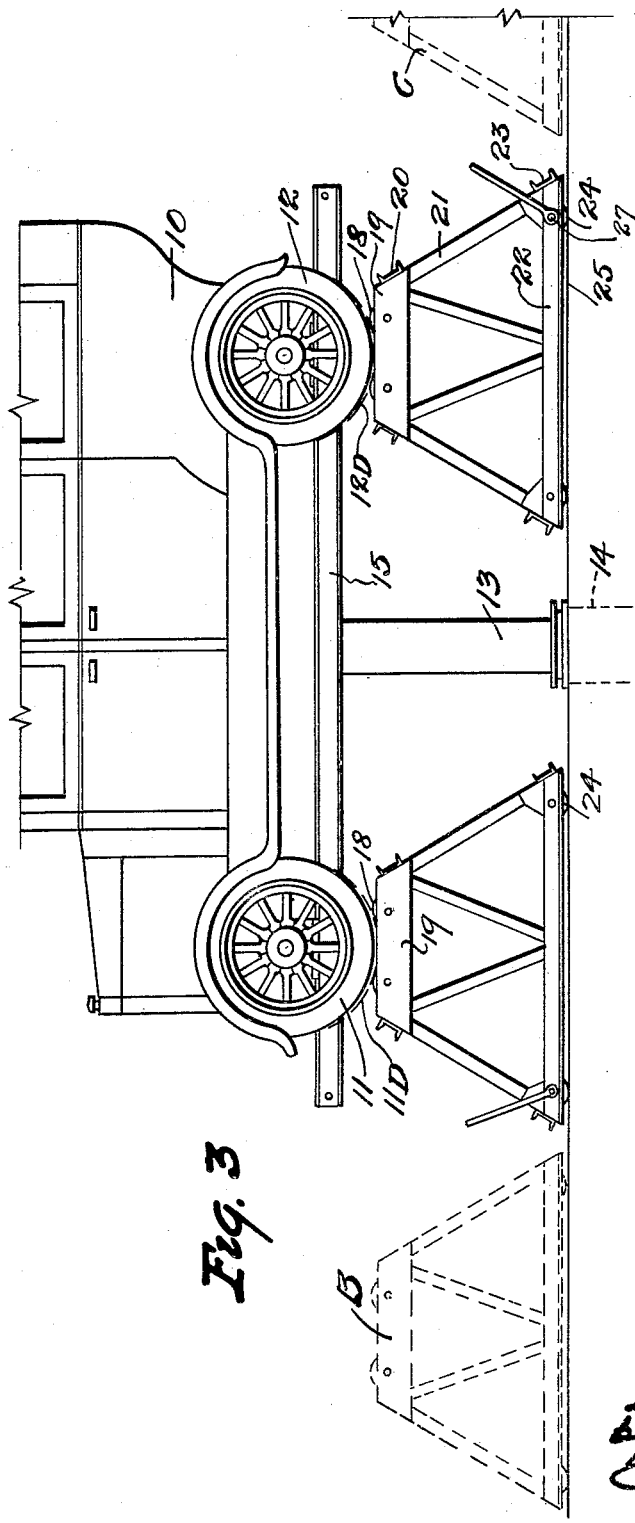
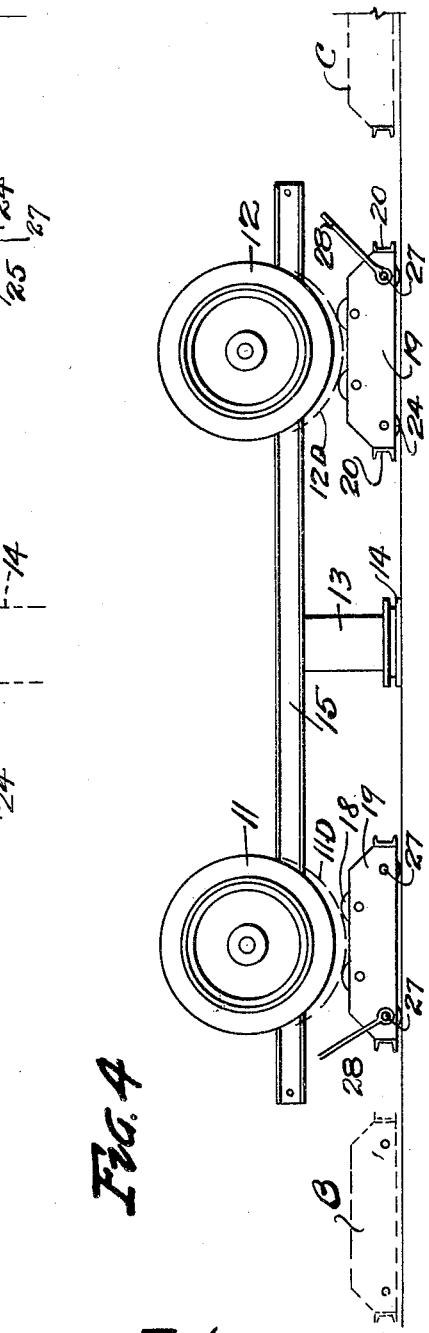

Jan. 17, 1933.  L. C. STUKENBORG  1,894,643
BRAKE TESTING MEANS AND METHOD FOR AUTOMOBILES
Filed May 27, 1929  3 Sheets-Sheet 3
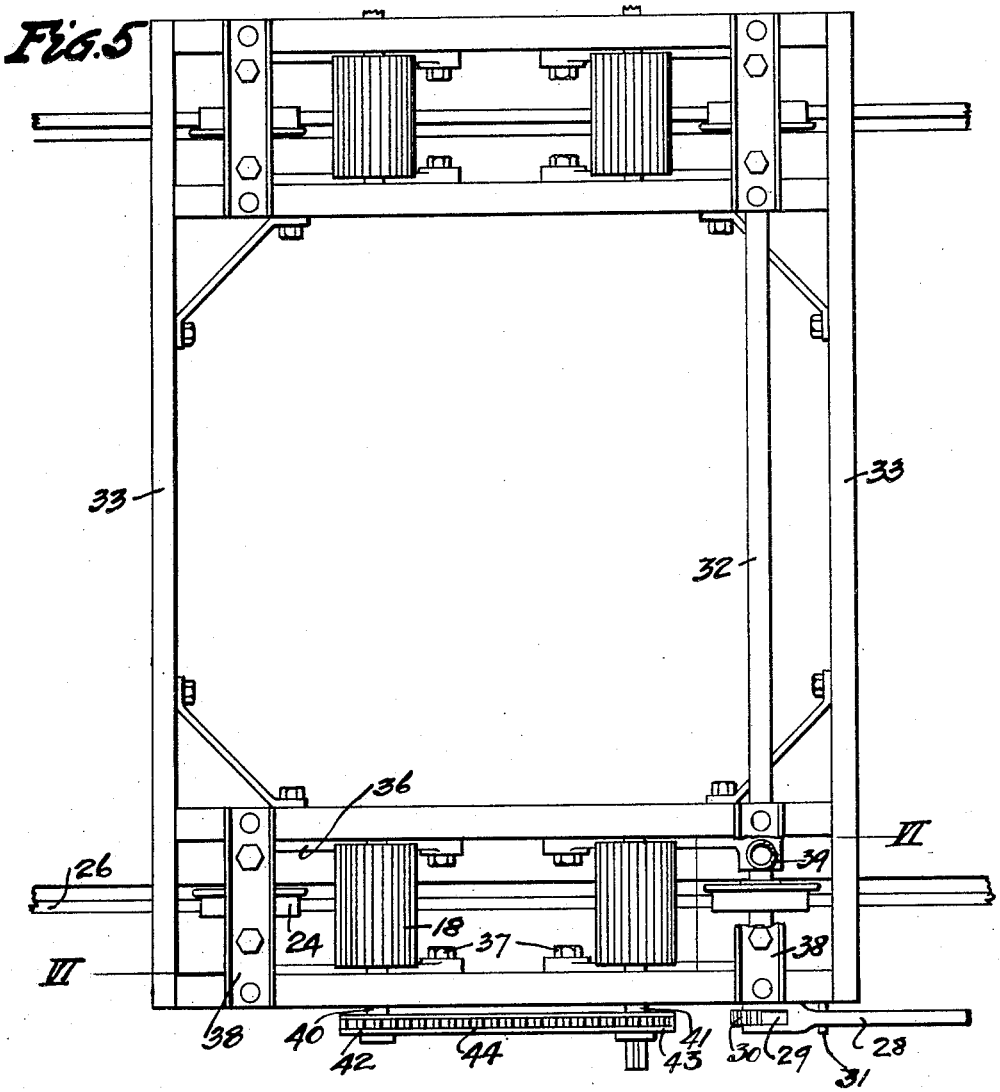
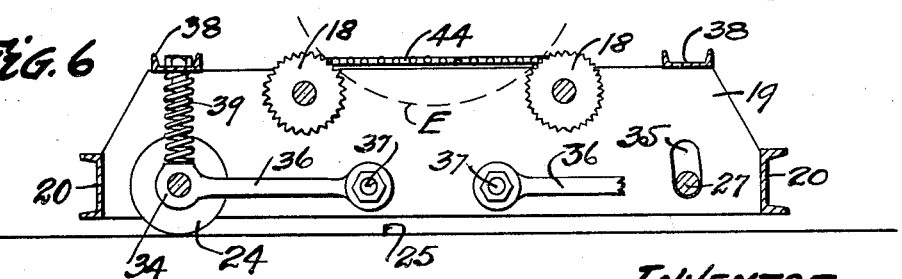
INVENTOR
LOUIS C. STUKENBORG.
By J. H. Weatherford
ATTORNEY.

Patented Jan. 17, 1933

1,894,643

UNITED STATES PATENT OFFICE

LOUIS C. STUKENBORG, OF MEMPHIS, TENNESSEE

BRAKE TESTING MEANS AND METHOD FOR AUTOMOBILES

Application filed May 27, 1929. Serial No. 366,135.

This invention relates to improvements in devices for testing the brakes of an automobile and has especial relation to the means and methods by which an automobile may be placed with its wheels on supporting devices on which, or on and by which, the wheels may be rotated while the brakes are being tested. It will then be understood that this invention relates to the supporting means as distinguished from the testing means proper.

In testing automobile brakes it is necessary to so support the auto that the wheels may be rotated and this is ordinarily done in one or two ways, first by placing a jack under the axle and raising the wheel clear of the ground and second by supporting the wheel on a pair of spaced rollers which are either left free to turn, so that the wheel may be rotated incidentally turning the rollers, or which rollers are turned by the testing device and the wheels thereby rotated.

Where the axle is supported on a jack and the wheel left free to rotate, the conditions obtained are different from those met with on the road, in that the weight is removed from the bearings and the concentricity of brake band and drum are altered.

The second of these methods is not open to this objection since the rollers support the wheel and car as the road does, it however has heretofore been open to the objection that the wheel must be rolled up an incline and over the first roller and then dropped into the depression between the rollers. Unless great care is exercised as this drop is made, the wheels bounce and in many cases throw the car off the rollers thereby at times damaging the testing device, or the car, or both, and often involving very considerable trouble in extricating the car. In addition to this, where all four wheels are placed for testing at the same time the forward rollers must be spaced at exactly the correct distance from the rear one to insure proper testing, the drop of all four wheels at the same time greatly accentuates the danger of bouncing off the rollers and if either set of wheels bounce off increases the difficulty of extricating the machine as well as the chance of damaging it. After the tests have been made, difficulty is again encountered in removing the car and oftentimes the drop of the rear wheel on to the rollers previously occupied by the front wheels is much more troublesome and dangerous.

These difficulties are so pronounced that it has been deemed unwise in any event to raise the car above ground level a sufficient amount to allow ready access to the brakes for adjustment and this has so far necessarily been done by digging pits in which the brake adjuster can stand. These pits in themselves are a constant source of danger from the aforementioned causes and are not tolerated by all users of brake testing machines. The dangers and difficulties in either case are so great that few if any owners are permitted to drive their cars on the tester, the work being entrusted almost always to operators familiar with the testers.

The present device is intended to obviate the difficulties heretofore encountered and has among its objects the following:

(a) To provide means for raising an automobile and placing the wheels thereof on supporting rollers for brake testing;

(b) To provide means whereby the auto wheels may be placed on rollers at a substantial elevation above ground level;

(c) To provide means for positioning the supporting rollers directly beneath the wheels to be tested;

(d) To provide means for restraining the movement of the frames carrying the rollers when they are under load;

(e) To provide means for moving both sets of rollers for either the front or rear wheels simultaneously into place;

(f) To provide means for removing the auto from the rollers after testing; and (g) To generally improve the design and construction of such devices.

The means by which the foregoing and other objects are accomplished and the manner of their accomplishment will readily be understood from the following specification on reference to the accompanying drawings, in which:—

Fig. 1 is a plan view showing the device with the wheels and axles only of an automobile in position as they would appear at the beginning of the placing cycle and at the completion of the cycle of operations.

Figs. 2 and 2A are enlarged fragmentary side elevations taken in the direction of the arrow "A" of Fig. 1, showing the mechanism for moving the roller frames into position.

Fig. 3 is a side elevation on substantially the scale of Fig. 1, showing the auto positioned above the testing rollers either before lowering thereon or after raising therefrom and showing the supporting rollers carried on a raised structure.

Fig. 4 is a similar view showing the wheels of the automobile in similar position over rollers in a low frame.

Fig. 5 is a plan view on an enlarged scale of a pair of roller frames connected to form a unitary structure and showing the rollers in the frames.

Fig. 6 is a similarly enlarged sectional elevation taken as on the line VI—VI of Fig. 5.

Referring now to the drawings in which the various parts are indicated by numerals, 10 is an automobile, the brakes on the front and rear wheels 11 and 12 respectively, of which, are to be tested. 13 is the plunger of a hydraulic jack, the cylinder 14 of which is sunk in the ground in usual manner and which plunger is rotatable about its vertical axis. 15 is a superstructure carried by the jack plunger and rotatable therewith. This superstructure is adapted to engage the axles of 16, 17 of the auto, or other portion of the understructure, with the wheels however free for rotation and lying outside of the superstructure. It will be understood that a hydraulic jack and superstructure are typical only and being well known need not here be shown in detail. It will further be understood that other types of jack or superstructure may be substituted for the ones here indicated so long as they accomplish raising, and permit rotation about the vertical axis of the jack.

18 are rollers in pairs spaced apart and lying parallel to each other which rollers are journalled in supporting side members 19. These side members preferably are connected together by transverse channels 20 to form a frame, and together with the rollers mounted therein will be designated as a roller unit.

In Fig. 3 the side members 19 are supported by posts or struts 21 and longitudinal bottom members 22 which members are preferably laterally braced by channels 23. Journalled in the bottom members 22 are casters 24 which roll along the ground or floor level 25 preferably on rails 26 or other pathways. Where such pathways are used ordinarily each will comprise two of the rails 26, spaced apart to conform to the gage of the casters 24. The pathways will be parallel and will lie one on each side of the jack 13, preferably equidistant therefrom, with the longitudinal axes of the pathways spaced to conform to the gage of the automobile wheel treads. These trackways may be continuous past the jack or may be interrupted as shown in Fig. 1, since such portion of the trackway is not ordinarily used in testing. The casters 24 are secured on shafts 27, which in Figs. 1 and 4, are journalled directly in the lower portion of the side members 19.

The roller frames or units may be shifted by hand along these pathways after the automobile has been raised and aligned with the wheels thereover. Final adjustment of the positioning of a unit may be accomplished by means of a lever 28 mounted on a shaft 27 and carrying a double end pawl 29 either end of which pawl may be engaged with a ratchet wheel 30, which is secured to the same shaft, to advance or retract the unit. Normally the pawl 29 is held out of engagement with the ratchet wheel in order that movement of the unit by hand may not be interfered with. 29A is a compression spring which bears against the end of an arm 29B which is integral with the pawl 29 whereby when the pawl is shifted in either direction until it engages the ratchet wheel it will be held in engagement therewith by such spring. 31 are stops limiting movement of the lever 28 and supporting it when the pawl is disengaged. In Figs. 1 and 5, one pair of the casters 24 of each unit is connected with the casters of the transversely disposed unit by a transverse shaft 32 which is ordinarily a continuation of the shafts 27. In such case both roller units, for either the front wheels or rear wheels, moves forward or backward in unison and final adjustment of the position of either unit of a pair places the other unit in proper position. In Fig. 5, the roller units for a front or rear pair of wheels are not only provided with the cross shaft 32 but are additionally secured together by channels 33 which may be a continuing portion of the channels 20 previously mentioned or supplementary thereto as desired. In such case a single pair of casters 24 may be used for each unit and a single rail 26 instead of a pair of rails before described.

In Fig. 6, bearings 34 independent of the side frames 19 are provided for the axles of shafts 27 of the casters 24. These shafts in such case preferably project beyond the bearings and through slots 35 in such frames. The bearings 34 are carried by arms 36 which are pivotally secured to the frames 19 as by bolts 37. Disposed immediately above the bearings 34 are channels 38 between which and the bearings, compression springs 39 are disposed. These springs are made of sufficient strength to support the weight of the units when not under load but of insufficient strength to support the unit when the auto wheel is resting thereon so that when the auto is in place for the brakes to be tested the roller unit will rest directly on the floor surface and be restrained by frictional resistance from shifting. Such construction may be applied to the low units shown in Fig. 4, or to the high units shown in Fig. 3, and to units having four casters as well as to those having two casters. It will further be understood that inherently it is not necessary to supply the units with casters although it is believed that such construction is desirable.

Where the rollers 18 are used for driving the wheels during testing they are ordinarily longitudinally corrugated as shown and are mounted on and secured to shafts 40 and 41, these shafts ordinarily carrying sprocket wheels 42, 43 respectively, which sprocket wheels are connected by sprocket chains 44, and thereby compelled to move in unison. One end of the shaft 41 is shown as extended beyond the gear 43 to provide means for attaching the tester mechanism, which mechanism not being a part hereof, is not shown.

In using the device the jack is lowered until the superstructure 15 rests on the surface of the ground preferably at right angles to the rails 26, or other pathways. The roller units are moved along the pathways outward from the jack to permit ample room for the automobile to be driven over the jack superstructure. Ordinarily when not in use, these units will occupy positions B, C, shown dotted, well away from interference with other uses of the jack.

The auto is driven over the jack with the superstructure 15 lying between the wheels and positioned with the axles about equidistant from the jacks. When properly positioned shoes 45 are shifted along the superstructure rails under the front axle and a cradle 46 similarly shifted beneath the rear axle. The auto is then raised to a position above the level of the rollers 18 and the superstructure is turned about the vertical axis of the jack until the wheels are longitudinally aligned over the track-ways. The roller units are then shifted directly beneath the wheels and the jack lowered until the entire weight of the car is supported by the rollers. Either of the units may then be shifted such amount as may be necessary to give full bearing of each wheel on its supporting rollers, such final adjustment is made by the ratchet arm 28 and associated parts. When the weight of the car comes on the rollers the springs 39 compress and substantially the entire weight of the auto is effectively to press the base of the roller units against the ground or floor surface effectually anchoring the units against movement.

The wheels when in place on the rollers, occupy the dotted position 11D, 12D, respectively. Since there is no necessity of the wheels lifting themselves out of the depression between the rollers by their own power the rollers may be spaced as far apart as may be desired provided only that such spacing does not allow the brake parts of the wheel to contact with the roller frames. In Fig. 6, the dotted line "E" indicates the depth to which the wheel may be allowed to come. Such deep placing of the wheel between the rollers effectually prevents the wheel from climbing when the rollers are being driven under test conditions, and to a large extent minimizes the necessity of anchorage during the tests. After the brakes have been tested the automobile is again raised by the jack, turned to clear it from the roller units and lowered until the wheels rest on the ground surface after which it may be driven away in usual manner.

Having described my invention, what I claim is:

1. In means for testing automobile brakes, a vertically disposed jack, a superstructure carried by said jack, to support an automobile for raising, turnable about said jack axis, said superstructure engageable with the understructure of the automobile, and when raised leaving the wheels free, parallel pathways spaced apart to conform to the wheelgage of the automobile, disposed one on each side of said jack, and wheel supporting rollers rotatably mounted, movable along said pathways toward and away from said jack, whereby an auto may be positioned over said superstructure, substantially at right angles to said pathways, be raised by said jack, and be aligned with its wheels over said pathways; said wheel supports be moved along said pathways each to a position beneath a wheel, said auto be lowered and supported thereon, and after testing be raised and removed therefrom.

2. In means for testing automobile brakes, a vertically disposed jack, a superstructure carried by said jack, to support an automobile for raising, turnable about said jack axis, said superstructure engageable with the understructure of the automobile, and when raised leaving the wheels free, parallel pathways spaced apart to conform to the wheelgage of the automobile, disposed one on each side of said jack and substantially equidistant therefrom, and wheel supporting units movable along said pathways toward and away from said jack, said units each comprising a frame, and a pair of rollers transverse to said pathways and spaced apart, whereby an auto may be positioned over said superstructure, substantially at right angles to said pathways, be raised by said jack, and be aligned with its wheels over said pathways; said supporting units be moved along said pathways each to a position beneath a wheel, said auto be lowered and supported thereon, and after testing be raised and removed therefrom.

3. In means for supporting an auto for brake testing, units each including a pair of side frames, parallel rollers spaced apart journalled in said frames, bearings carried by said frames, shafts journalled in said bearings, an end of one of said shafts projecting beyond its bearing and frame, casters mounted on and secured to said shafts, a ratchet wheel secured on said shaft end, a ratchet lever oscillatably mounted on said shaft adjacent said wheel, and a double ended pawl carried by said arm and optionally engageable with said wheel to rotate said caster and shift said frame.

4. In a brake tester, means for raising an automobile with the wheels free, and supporting same for rotation about a vertical axis, wheel supporting units in pairs spaced transversely apart to conform to the wheel spacing of an auto, each unit comprising a frame and a pair of transverse and parallel rollers spaced apart and journalled in said frame, said unit pairs being manually movable toward and away from said vertical axis, whereby said auto may be raised and rotated with the wheels into the path of said units, and thereafter said units be moved toward said jack to position them under said wheels, and said auto be lowered into supported position on said rollers.

5. Means for supporting an auto for brake testing including means rotatable about a vertical axis for raising an automobile with the wheels free, parallel pathways spaced apart to conform to the wheel gauge of the automobile, disposed one on each side of said vertical axis, and wheel supporting units disposed on and movable along said pathways, said units each comprising a frame and a pair of parallel rollers, spaced apart and journalled in said frame; whereby an auto may be raised and positioned with its wheels over said path-ways and said wheel supporting units be moved along said path-ways, each to a position beneath a wheel and said auto be lowered and supported thereon.

6. In means for supporting an auto for brake testing, units each including a pair of side frames, transverse members securing said frames together, parallel rollers spaced apart journalled in said frames, arms, having each an end pivotally attached to said frames, casters, each carried by the free ends of a pair of said arms and compression springs disposed between said bearings and members of said frame, urging said bearings downward, said springs being compressible under load to permit said frame to rest directly on the floor.

7. In means for supporting an auto for brake testing, units each including a pair of side frames, parallel rollers spaced apart, journalled in said frames, bearings carried by said frames, shafts journalled in said bearings, casters mounted on and secured to said shafts, an end of one of said shafts projecting beyond its bearing and frame, a ratchet secured on said shaft end, and means optionally engageable with said ratchet wheel to rotate said caster and shift said frame.

In testimony whereof I hereunto affix my signature.

LOUIS C. STUKENBORG.